US011835360B2

(12) United States Patent
Haas et al.

(10) Patent No.: US 11,835,360 B2
(45) Date of Patent: Dec. 5, 2023

(54) IDENTIFYING HIGH-PRIORITY AVOIDANCE AREAS IN MAPS FOR ROUTING AUTONOMOUS VEHICLES

(71) Applicant: GM Cruise Holdings LLC, San Francisco, CA (US)

(72) Inventors: Patrick Tyler Haas, San Francisco, CA (US); Sarah M. Rizk, San Francisco, CA (US); Jaimin Liang-Yan Hsu, Oakland, CA (US); Joseph James Reid, Berkeley, CA (US); Luke Pulaski, Oakland, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 265 days.

(21) Appl. No.: 17/513,655

(22) Filed: Oct. 28, 2021

(65) Prior Publication Data

US 2023/0139072 A1     May 4, 2023

(51) Int. Cl.
*B60W 40/04* (2006.01)
*G01C 21/00* (2006.01)
*B60W 60/00* (2020.01)

(52) U.S. Cl.
CPC ......... *G01C 21/3859* (2020.08); *B60W 40/04* (2013.01); *B60W 60/001* (2020.02); *G01C 21/3815* (2020.08)

(58) Field of Classification Search
CPC .......... G01C 21/3859; G01C 21/3815; B60W 60/001; B60W 40/04
See application file for complete search history.

(56) References Cited

U.S. PATENT DOCUMENTS

| 10,962,380 | B2 | 3/2021 | Sood et al. | |
| 2020/0200552 | A1* | 6/2020 | Sood ................ | G01C 21/3461 |
| 2020/0233415 | A1* | 7/2020 | Panzica .............. | G01C 21/3461 |

* cited by examiner

*Primary Examiner* — Vivek D Koppikar
*Assistant Examiner* — Jeffrey R Chalhoub
(74) *Attorney, Agent, or Firm* — Akona IP PC (57) ABSTRACT

A map database stores data describing a set of connected roads each having one or more lanes, each having one or more lanes. The map database further stores data describing at an avoidance area comprising an area in the map database that an autonomous vehicle (AV) avoids traversing. A routability system determines at least one lane that can be accessed by the AV if the AV traverses the avoidance area, and generates a restored coverage area corresponding to the at least one lane. The restored coverage area corresponds to an area of restored coverage provided by the AV traversing the avoidance area. The routability system computes a score based on the restored coverage area, the score indicating an impact of restoring access by the AV to the avoidance area.

17 Claims, 5 Drawing Sheets

IDENTIFYING HIGH-PRIORITY AVOIDANCE AREAS IN MAPS FOR ROUTING AUTONOMOUS VEHICLES

TECHNICAL FIELD OF THE DISCLOSURE

The present disclosure relates generally to autonomous vehicles and, more specifically, to methods and systems for assessing impacts of avoidance areas in maps used for routing autonomous vehicles.

BACKGROUND

Fleets of autonomous vehicles (AVs) can provide various services, such as passenger transport and delivery transport. The AVs carry out such services by autonomously driving along a network of interconnected roads. The AVs rely on a map that describes the roads that the AVs can drive along. AVs may avoid driving along certain roads in the map for various reasons. For example, an AV may avoid the road due to issues with the roadway itself, such as if a road is temporarily closed, or if a road has low visibility. In some cases, an AV avoids a road when a real-world change has been identified (e.g., a change has been flagged by another AV in the fleet), but the change has not yet been incorporated into the map, e.g., if a new stop sign or speed bump has been observed but has not yet been added to the map. As another example, the AV may avoid a road due to AV software limitations, e.g., if the AVs are not trained to navigate a certain type of roadway or intersection, or if previous AVs have had difficulty navigating on a particular road due to a software bug.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

AVs travel between locations on networks of roads. The road network may include public roads (e.g., city streets, highways, etc.) and private roads (e.g., driveways, parking lots, and other roads on private property). AVs rely on a map describing the road network to navigate the road network. The map includes a high level of detail, including the geographic parameters of roads, connections between roads, the locations of various features in the road (e.g., the positions of different lanes, speed bumps, medians or other on-road barriers, rumble strips, etc.), pedestrian crossings, traffic signs, stop lights, and various other features near roads (e.g., fire hydrants, bus stops, trash cans, etc.).

As noted above, various factors can cause AVs to avoid certain portions of the road network. These factors may include issues with a road itself, such as a road closure or a road with low visibility. As another example, AVs avoid a road when a real-world change from the map data describing the road has been identified (e.g., a change has been flagged by another AV in the fleet), but the change has not yet been incorporated into the map data, e.g., when a new stop sign or speed bump has been observed, but the feature is not reflected in the map data. As another example, the AV may avoid a road due to AV software limitations, e.g., if the AVs are not trained to navigate a certain type of roadway or intersection, or if previous AVs have had difficulty navigating on a particular road due to a software bug. Areas that AVs avoid traversing (e.g., driving to or driving through) are referred to as avoidance areas, and these avoidance areas are labelled in the map data.

In some implementations, AVs may not drive on avoidance areas at all, e.g., routing software prohibits AVs from traversing avoidance areas. In other embodiments, AVs may at times traverse avoidance areas, or may traverse some subset of avoidance areas, but a routing software used by an AV prefers routes that avoid the avoidance areas when possible. For example, a routing software may weight the avoidance areas to cause AVs to tend to navigate around them, unless they are highly preferred (e.g., if reaching a destination address requires traversing an avoidance area, or if routing around an avoidance area adds a considerable distance or travel time to a route).

Avoidance areas can impact the quality of a service or services provided by the AV fleet. For example, if the AV fleet is used to provide rides to users or make deliveries to users, avoidance areas can impact whether an AV can reach a particular location, or how long it takes an AV to reach a particular location. Different avoidance areas can have different degrees of impact, e.g., depending on where an avoidance area fits into a road network, or the demand for services near an avoidance area. For example, if one lane of a low-traffic two-way street is marked as an avoidance area (e.g., due to a recent change in traffic pattern to turn onto the avoided lane), but the AV can still drive down another lane traveling in the opposite direction, the impact on a delivery user requesting a delivery to an address along the avoidance lane may be low, since the user can simply cross the street to reach the AV. On the other hand, if another avoidance area prevents an AV from driving down a one-way street, AVs cannot reach any addresses along this street, the user requesting delivery along the one-way street would have a longer walk to reach the AV on a nearby street.

Avoidance areas can be restored to a routable map so that AVs can travel through the avoidance areas. Restoring an avoidance area may allow the routing software to route an AV to traverse the avoidance area (if the avoidance area was prohibited), or may remove a weighting or reduced preference (if the avoidance area was less preferred by the routing software). Depending on the type of avoidance area, different personnel associated with a map provider or fleet management system may have to make changes to the map database and/or to AV software to restore a particular avoidance area. For example, a map manager may manually update a map database to reflect real-world changes to a roadway, and after the map database is updated, the map manager restores the avoidance area to the map. Other map updates may be partially automated, but the avoidance area is not restored until human reviews the map update. As another example, a software engineer may make changes to the AV software to address a software bug or limitation that prevented an AV from routing through an avoidance area or set of related avoidance areas.

Given limited resources for updating maps and/or AV software, it can be challenging for the map providers or software engineers to determine which avoidance areas to address first. A naïve approach may address the oldest avoidance areas first. However, resources can be better utilized by addressing the most impactful avoidance areas, e.g., avoidance areas that affect the widest area, or avoidance areas that impact the most users.

As described herein, a mapping system can determine impacts of restoring avoidance areas to a routable map. The mapping system may be an AV fleet management system that maintains map data used by the AV fleet. The mapping system stores a map database that includes data describing avoidance areas. For a given avoidance area, the mapping system determines an area that can be accessed by the AV if the AV traverses the avoidance area. For example, the mapping system may determine a first routable lane graph based on roadways that the AV can route to given the current state of the map (including avoidance areas), and a second routable lane graph based on roadways that the AV can route to if the avoidance area is restored. The mapping system may determine a first coverage area for the first routable lane graph, e.g., by generating and combining buffers corresponding to the first routable lane graph. The mapping system may determine a second coverage area for the second routable lane graph in a similar manner. The mapping system identifies a portion of the second coverage area that is not in the first coverage as a restored coverage area, i.e., a coverage area that is gained by restoring the avoidance area to the map. If an avoidance area is not prohibited but instead merely less preferred (e.g., weighted to reduce likelihood that AVs traverse the avoidance area), the mapping system may determine the first routable lane graph as though the avoidance area were prohibited, and determine the second routable lane graph as though the avoidance area were not prohibited.

The mapping system may determine a score for the avoidance area based on the restored coverage area. In one embodiment, the score is an area of the restored coverage area, so that avoidance areas that result in a larger restored coverage area have higher scores. In another embodiment, the score is based on a market weighting for the restored coverage area, e.g., a historical or projected demand for service in the restored coverage area. The mapping system can use the scores to compare different coverage areas, and the mapping system can identify or prioritize avoidance areas for restoration based on the scores.

In some cases, restoring a set of avoidance areas may have an outsized impact on routability, e.g., restoring two nearby or related avoidance areas may have a greater impact than a sum of the impact of restoring either avoidance area alone. To find such avoidance areas, the mapping system may identify a cluster of two or more avoidance areas, determine a restored coverage area if the cluster of avoidance areas are all restored, and determine a score based on the restored coverage area. A cluster of avoidance areas may be identified based on geographic proximity or network proximity (e.g., the number of maneuvers to reach one avoidance area from another avoidance area). As another example, a cluster of avoidance areas may be associated with a common software update, e.g., a set of avoidance areas that are all related to a single software limitation or bug.

Embodiments of the present disclosure provide a method for determining and displaying a coverage area, and a computer-readable medium for performing the method. The method includes identifying an avoidance area in a map database, the map database storing data describing a set of connected roads each having one or more lanes, and the avoidance area comprising an area in the map database that an AV avoids traversing; determining at least one lane that can be accessed by the AV if the AV traverses the avoidance area; generating a restored coverage area corresponding to the at least one lane, the restored coverage area corresponding to an area of restored coverage provided by the AV traversing the avoidance area; and computing a score based on the restored coverage area, the score indicating an impact of restoring access by the AV to the avoidance area.

Embodiments of the present disclosure provide a system having a map database and computer circuitry. The map database stores data describing a set of connected roads each having one or more lanes, and the avoidance area comprising an area in the map database that an AV avoids traversing. The computer circuitry is to identify an avoidance area in the map database; determine at least one lane that can be accessed by the AV if the AV traverses the avoidance area; generate a restored coverage area corresponding to the at least one lane, the restored coverage area corresponding to an area of restored coverage provided by the AV traversing the avoidance area; and compute a score based on the restored coverage area, the score indicating an impact of restoring access by the AV to the avoidance area.

As will be appreciated by one skilled in the art, aspects of the present disclosure, in particular aspects of generating and displaying service coverage areas for AVs, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example AV System for Assessing Avoidance Areas

Figure 1:
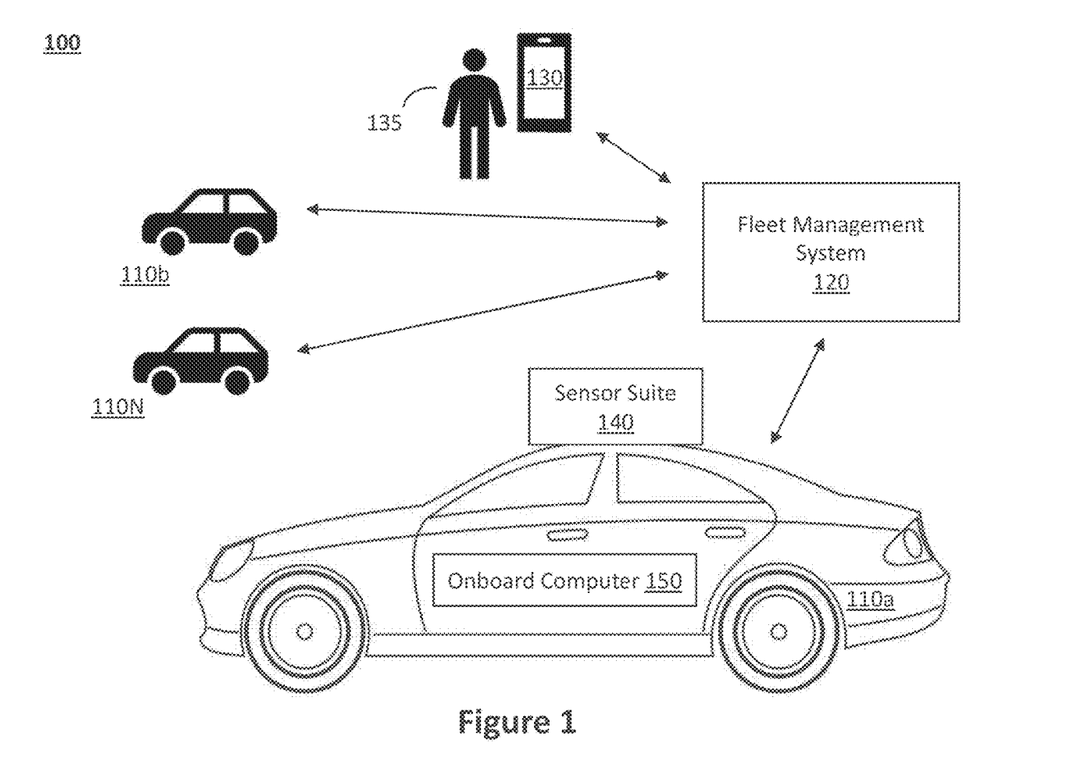
FIG. 1 is a block diagram illustrating a system including an example AV fleet and fleet management system for assessing avoidance areas according to some embodiments of the present disclosure.

FIG. 1 is a block diagram illustrating a system 100 including an example AV fleet and fleet management system for assessing avoidance areas according to some embodiments of the present disclosure. The system 100 includes a fleet of autonomous vehicles (AVs) 110, including AV 110*a*, AV 110*b*, and AV 110N, a fleet management system 120, and a user device 130. For example, a fleet of AVs may include a number N of AVs, e.g., AV 110*a* through AV 110N. AV 110*a* includes a sensor suite 140 and an onboard computer 150. AVs 110*b* through 110N also include the sensor suite 140 and onboard computer 150. A single AV in the fleet is referred to herein as AV 110, and the fleet of AVs is referred to collectively as AVs 110.

The fleet management system 120 receives service requests for the AVs 110 from user devices, such as user device 130. For example, the user 135 accesses an app executing on the user device 130 and, using the app, enters a ride request including a pickup location and a drop-off location. The fleet management system 120 dispatches AVs 110 to carry out the service requests. The fleet management system 120 also maintains a map database. When an AV 110 is dispatched for a service request, the fleet management system 120 and/or the AV 110 determines a route for the AV 110 to follow based on the data in the map database. The route avoids any avoidance areas labelled in the map database. In some embodiments, routes are selected so that avoidance areas are not traversed; in other embodiments, routes are selected so that at least some avoidance areas may be traversed, but routes that traverse avoidance areas are less preferred, e.g., by weighting the avoidance areas. If a user requests service at an address that the AV 110 cannot route to due to an avoidance area, the fleet management system 120 and/or the AV 110 may determine the nearest location to the address that the AV 110 is able to reach without traversing the avoidance area. The app on the user device 130 indicates the determined location to the user 135, and in some cases, the user 135 may cancel the service, e.g., if the user 135 cannot walk to the location, or if the location is too far away.

The AV 110 is preferably a fully autonomous automobile, but may additionally or alternatively be any semi-autonomous or fully autonomous vehicle; e.g., a boat, an unmanned aerial vehicle, a self-driving car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include photodetectors, cameras, radar, sonar, lidar, GPS, wheel speed sensors, inertial measurement units (IMUS), accelerometers, microphones, strain gauges, pressure monitors, barometers, thermometers, altimeters, etc. The sensors may be located in various positions in and around the AV 110.

An onboard computer 150 is connected to the sensor suite 140 and functions to control the AV 110 and to process sensed data from the sensor suite 140 and/or other sensors in order to determine the state of the AV 110. Based upon the vehicle state and programmed instructions, the onboard computer 150 modifies or controls behavior of the AV 110. For example, the onboard computer 150 maneuvers the AV 110 according to routing selections determined by an onboard or remote navigation system.

The onboard computer 150 is preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems.

The onboard computer 150 may collect data describing roads on which the AV 110 travels or in the vicinity of the AV 110 and transmit the collected data to the fleet management system 120. For example, based on sensed data from the sensor suite 140, the onboard computer 150 may identify differences between an observed road and the map data (e.g., added or removed traffic signs, added or removed stop signs, road construction, new speedbumps, etc.) and report these differences to the fleet management system 120. The fleet management system 120 may automatically create an avoidance area based on the information from the AV and add the avoidance area to the map database. In some embodiments, the fleet management system 120 may create an avoidance area in response to a threshold number and/or proportion of AVs identifying the change, and/or for particular types of observations.

The fleet management system 120 manages the fleet of AVs 110. The fleet management system 120 may manage a service that provides or uses the AVs 110, e.g., a service for providing rides to users with the AVs 110, or a service that delivers items, such as prepared foods, groceries, or packages, using the AVs 110. The fleet management system 120 may select an AV from the fleet of AVs 110 to perform a particular service or other task, and instruct the selected AV (e.g., AV 110a) to autonomously drive to a particular location (e.g., a pickup address or a delivery address). If the AV 110 cannot drive directly to a particular address or location, or cannot stop at the location, the fleet management system 120 may select a nearby location where the AV 110 can drive to and stop, as noted above. The fleet management system 120 may select a route for the AV 110 to follow. The fleet management system 120 also manages fleet maintenance tasks, such as charging and servicing of the AVs 110.

As shown in FIG. 1, each of the AVs 110 communicates with the fleet management system 120. The AVs 110 and fleet management system 120 may connect over a public network, such as the Internet. The fleet management system 120 is described further in relation to FIG. 2.

The user device 130 is a personal device of the user 135, e.g., a smartphone, tablet, computer, or other device for interfacing with a user of the fleet management system 120. The user device 130 may provide one or more applications (e.g., mobile device apps or browser-based apps) with which the user 135 can interface with a service that provides or uses AVs. The service, and the AVs 110 associated with the service, are managed by the fleet management system 120, which may also provide the application to the user device 130. In other embodiments, the service is managed by a separate system (e.g., a food delivery service) that relies on the AV fleet for some or all of its transportation tasks and interacts with the fleet management system 120 to arrange transportation tasks.

Example Fleet Management System

Figure 2:
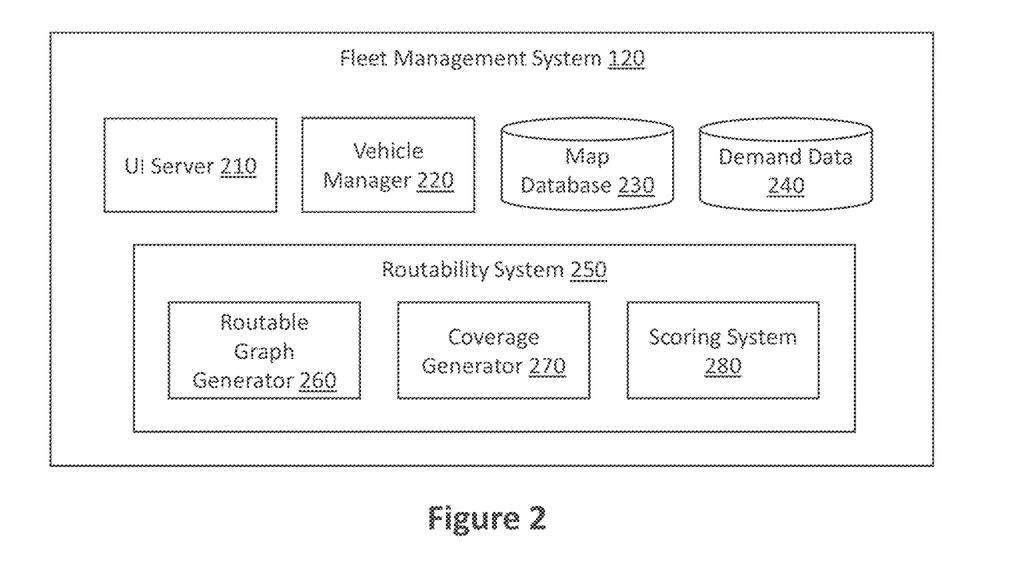
FIG. 2 is a block diagram illustrating a fleet management system for assessing and restoring avoidance areas in a map according to some embodiments of the present disclosure.

FIG. 2 is a block diagram illustrating the fleet management system 120 according to some embodiments of the present disclosure. The fleet management system 120 includes a UI (user interface) server 210, a vehicle manager 220, a map database 230, demand data 240, and a routability system 250. The routability system 250 includes a routable graph generator 260, a coverage generator 270, and a scoring system 280. In alternative configurations, different and/or additional components may be included in the fleet management system 120. Further, functionality attributed to one component of the fleet management system 120 may be accomplished by a different component included in the fleet management system 120 or a different system than those illustrated.

The UI server 210 is configured to communicate with client devices, such as user device 130, that provide a user interface to users. For example, the UI server 210 may be a web server that provides a browser-based application to client devices, or the UI server 210 may be a mobile app server that interfaces with a mobile app installed on client devices. The user interface enables the user to access a service of the fleet management system 120, e.g., to request a ride from an AV 110, or to request a delivery from an AV 110.

The vehicle manager 220 manages and communicates with a fleet of AVs, including AVs 110a through 110N. The UI server 210 transmits service requests received from users to the vehicle manager 220, and the vehicle manager 220 assigns AVs 110 to the service requests. More broadly, the vehicle manager 220 directs the movements of the AVs 110 in the fleet. For example, the vehicle manager 220 may instruct AVs 110 to drive to other locations while not servicing a user, e.g., to improve geographic distribution of the fleet, to anticipate demand at particular locations, to drive to a charging station for charging, etc. The vehicle manager 220 also instructs AVs 110 to return to AV facilities for recharging, maintenance, or storage. The vehicle manager 220 may interface with a navigation system, which selects a route for an AV 110 to follow, and may select locations for the AV 110 to stop. The navigation system may be a component of the vehicle manager 220, a separate component of the fleet management system 120, or a component of the onboard computer 150. Alternatively, navigation functions may be distributed across multiple systems, including the AV 110 and the fleet management system 120.

As an example, the UI server 210 receives a service request from a user, such as a request for a ride, and the UI server 210 passes this request to the vehicle manager 220. The vehicle manager 220 selects an AV 110 of the fleet to carry out the service request. The vehicle manager 220 identifies the origin location (e.g., starting point of the AV 110), destination location (e.g., drop-off location), and any waypoints (e.g., location to pick up the user). The navigation system determines a route for the AV 110 using map data in the map database 230, as described below, and provides the route to the AV 110. The route avoids any avoidance areas in the map database 230. The vehicle manager 220 may receive updates about the location of the AV 110. The navigation system may periodically recalculate a route for the AV 110, e.g., based on changing traffic conditions.

The map database 230 stores data describing a set of connected roads. The map database 230 includes data describing each road, such as data describing geographic location of the road, connections to other roads, speed data (e.g., speed limit), and traffic flow direction. Many roads have multiple lanes, including one or more travel lanes along which vehicles can drive, parking lanes, bike lanes, bus lanes, pedestrian lanes, etc. A lane may comprise a portion of a road physically marked (e.g., by painting, a median, reflective markers, etc.), or a portion of a road on which vehicles travel or park by convention (e.g., the two sides of an unpainted two-way street may be considered two travel lanes running in opposite directions).

The map database 230 may include lane-level data describing individual lanes. The lane-level data may be arranged as or used to generate a routable lane graph in which each lane includes a start point, an end point, and connections to one or more other lanes in the road network. A routable lane graph may further include maneuver rules indicating how AVs 110 may travel along and between lanes. A lane may extend through an intersection, or a portion of a roadway through an intersection may be considered a distinct lane from a corresponding portion before the intersection. In some examples, multiple lanes overlap, such as lanes for different maneuvers through intersections.

The map database 230 may include additional lane-level parameters describing lanes in the routable graph. Additional parameters may include the position of a given lane relative to other lanes, e.g., whether the lane is a single-lane road, or the position of the lane relative to other lanes of a multi-lane road. The lane-level parameters may include attributes describing the environment of a given lane, such as attributes describing any visual obstructions associated with the lane (e.g., trees, statues, buildings, or fences that obstruct the view of oncoming traffic) or physical obstructions (e.g., downed trees, construction, large potholes). Additional lane-level parameters may include measurements of geometric features of the lane, such as width of a lane at various points or along a span (e.g., average and/or minimum width for the lane along each city block), curvature (e.g., maximum or average curvature around a turn), or grade (e.g., maximum and/or average grade of the lane along a city block).

Further lane-level or road-level parameters include physical features of the lane, such as speed bumps, medians or other on-road barriers, rumble strips, pedestrian crossings across the road or lane, railroad crossings, etc. The map database 230 also stores data describing features around the roadway, such stop lights and various traffic signs regulating traffic (e.g., stop signs, yield signs, speed limits, parking regulations, traffic pattern changes, etc.) stop lights. Other features that may be included in the map database 230 can include road barriers, fire hydrants, bus stops, trash cans, benches, buildings, or other objects near the road.

The map database 230 is frequently updated based on real-world changes to the road network. Some lane changes occur in a regular pattern, such as a lane that travels in one direction during a morning rush hour and travels in another direction during an afternoon rush hour, long-term nighttime construction hours on a particular road, and parking/stopping restrictions that apply during portions of the day. Some lane changes may be predictable, such as planned road closures for parades or events. Other lane changes occur without warning, such as when new road construction begins, or when traffic regulations are added or removed (e.g., a stoplight or stop sign is added or removed). The fleet management system 120 may receive information describing roadway changes from various data sources, including from the fleet of AVs 110 traveling along the road network. When a change is registered, the fleet management system 120 may initially add an avoidance area to the map database 230, so that AVs 110 do not traverse the avoidance area, or are less likely to traverse the avoidance area (e.g., by giving preference to alternate routes). At a later time, if the map database 230 is updated, the avoidance area may be removed from the map database 230. In some cases, an avoidance area may not be created based on a change to the real-world area, but due to an issue with the AV 110 itself, e.g., if the AV 110, the vehicle manager 220, or a fleet operator registers a software bug that makes it difficult for the AV 110 to traverse a particular road or lane.

The demand data 240 describes demand for AV service at different locations, e.g., at different addresses in the map database 230. The demand data 240 may be aggregated by the fleet management system 120 based on service requests received through the UI server 210. For example, the demand data 240 may include data from all previously received service requests, which can be used to determine which geographic areas have a higher demand for AV service. The demand data 240 may be aggregated from one or more external services, e.g., outside aggregators of location-based demand for AV services. The demand data 240 may include projected demand data, or the demand data 240 may include historical demand data that can be used (e.g., by the scoring system 280 or another component) to calculate projected demand data. The demand data 240 may store demand for different types of services, e.g., rideshare demand and delivery demand.

The routability system 250 assesses the avoidance areas in the map database 230. The routability system 250 includes a routable graph generator 260, a coverage generator 270, and a scoring system 280. The routability system 250 performs a process for assessing avoidance areas by generating a baseline routable lane graph and one or more alternate routable lane graphs with avoidance area(s) removed, determining coverage for the baseline lane graph and the alternate lane graph(s), and scoring the impact of removing the avoidance area(s). An example process performed by the routability system 250 to assess avoidance areas is detailed in relation to FIGS. 3 and 4.

The routable graph generator 260 generates a routable lane graph based on the map data in the map database 230. A routable lane graph may include a set of lanes, which may be represented as lines, and a set of nodes, where each node connects two or more lanes. The routable lane graph represents how an AV 110 can traverse the roadways (and, in particular, the lanes) represented in the map database 230. Example portions of routable lane graphs are shown in FIGS. 4-10. The routable graph generator 260 may generate multiple different lane graphs by restoring one or more avoidance areas, i.e., by removing one or more avoidance areas from the map data. A routable lane graph created with an avoidance area restored indicates how an AV 110 could traverse the lanes represented in the map database 230 if the avoidance area were removed from the map database 230, e.g., if the map database 230 were updated so that the avoidance area could be removed. If some or all avoidance areas are not prohibited from travel but instead are merely less preferred (e.g., weighted to reduce likelihood that AVs 110 traverse the avoidance areas), the routable graph generator 260 may determine the baseline routable lane graph as though these avoidance areas were prohibited, and determine routable lane graphs with avoidance area(s) restored as though one or more of the avoidance areas were not prohibited.

The coverage generator 270 determines a coverage area based on a routable lane graph. For example, for each of the lanes in the routable lane graph, the coverage generator 270 calculates a buffer around the lane. If, for example, a lane is represented as a line, the coverage generator 270 creates a buffer that extends a particular distance around the line. The distance used to generate the buffer areas may be a reasonable walking distance between a service address and the AV, e.g., 5 meters, 10 meters, or 50 meters. The coverage generator 270 combines the buffers generated for each of the lanes to generate a coverage area. Because the lanes are connected, and buffer areas are larger than the areas of the lanes themselves, some buffers overlap. The coverage generator 270 de-duplicates the overlapping areas to generate the coverage area. The coverage area represents an area that the AV fleet 110 can reach based on the map data. The coverage generator 270 may generate multiple coverage areas based on the different routable lane graphs described above, e.g., based on the baseline lane graph as well as various lane graphs with one or more avoidance areas removed.

The scoring system 280 determines scores for avoidance areas based on the coverage areas generated by the coverage generator 270. For example, for a given avoidance area, the coverage generator 270 determines a restored area, which is an area that is not in a baseline coverage area but is included in a coverage area generated with the avoidance area removed. The scoring system 280 may determine a score based on the size of the restored area. The scoring system 280 may determine a score based on the size of the restored area and/or one or more other factors related to the avoidance area or the restored coverage area, such as demand for AV services in the restored coverage area.

Example Process for Assessing and Restoring Avoidance Areas

Figure 3:
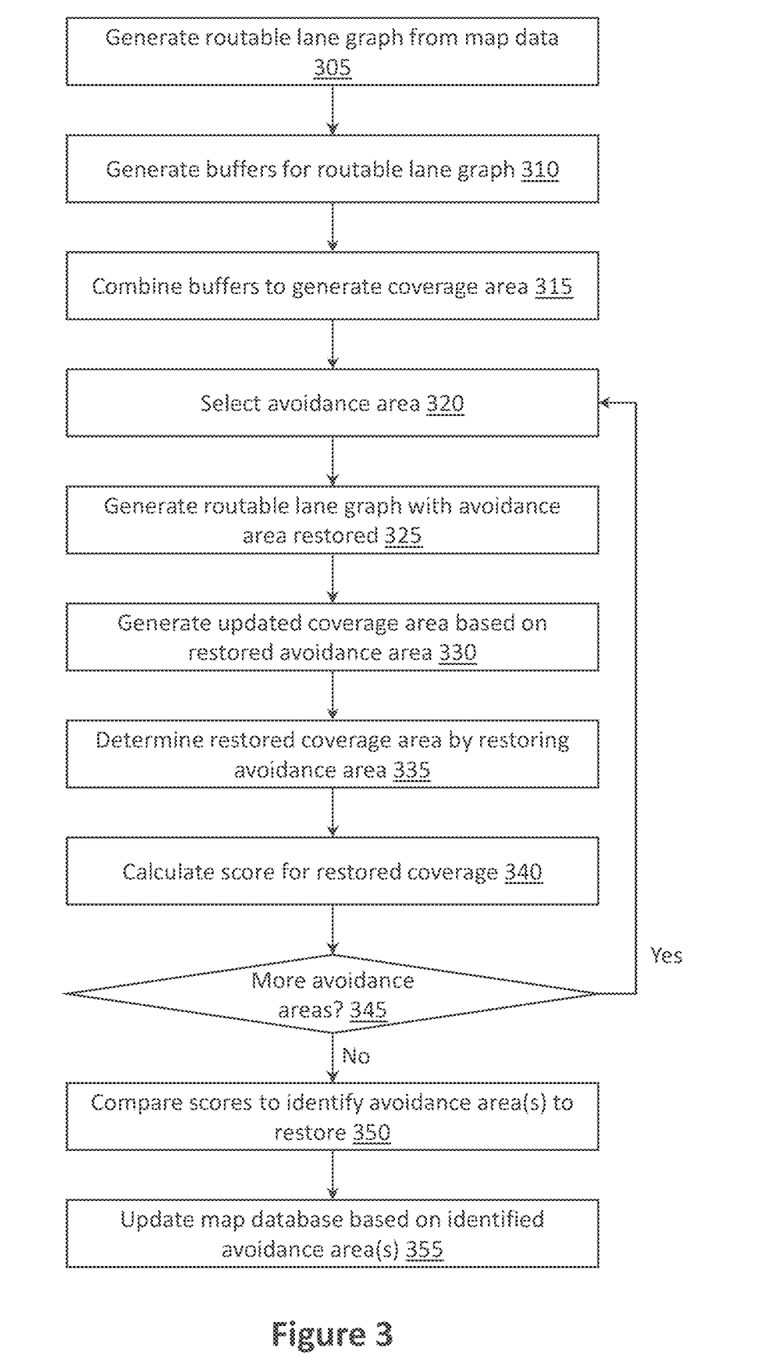
FIG. 3 is a flow chart of a process of assessing and restoring avoidance areas in a map according to some embodiments of the present disclosure.

FIG. 3 is a flow chart of a process of assessing and restoring avoidance areas in a map according to some embodiments of the present disclosure. FIGS. 4A-4F illustrate various stages in the process shown in FIG. 3 of assessing avoidance areas. The process shown in FIG. 3 may be performed by the routability system 250 of the fleet management system 120, as described below. Alternatively, the process shown in FIG. 3 may be performed by any other system that manages a map that is used by AVs, e.g., a mapping system used by AVs that is not affiliated with an AV fleet manager. The routability system 250 or other system may perform the process shown in FIG. 3 on a regular basis, e.g., daily or weekly.

The routable graph generator 260 generates 305 a routable lane graph from the map data in the map database 230. The routable lane graph includes connected lanes along which the AV 110 can be routed. The routable lane graph may be referred to as a baseline routable lane graph, i.e., a lane graph representing routable lanes in the current map database 230, where lanes that traverse avoidance areas in the map database 230 are not considered routable.

Figure 4A:
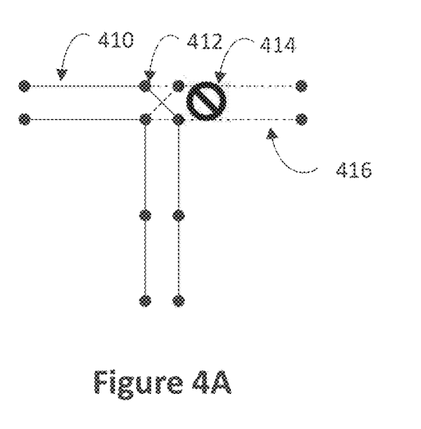
FIGS. 4A-4F illustrate various stages in the process shown in FIG. 3 of assessing avoidance areas according to some embodiments of the present disclosure.

An example portion of a routable lane graph is shown in FIG. 4A. The routable lane graph in FIG. 4A represents two two-lane roads that cross at a T-intersection. FIG. 4A includes various lines, e.g., line 410, that are connected by nodes, e.g., node 412, where the lines represent lanes, and the nodes represent connections between the lanes. Each lane represented by a solid line represents a possible path that an AV 110 can take along the roads and through the T-intersection. FIG. 4A also includes an avoidance area 414. For example, the avoidance area 414 may be the location of newly added pedestrian crosswalk that was observed by an AV 110 but has not been added to the map database 230. In this example, several lanes that extend to or through the avoidance area 414 are indicated in dashed lines, e.g., dashed line 416. The dashed lines indicate that an AV 110 does not traverse these lanes due to the avoidance area 414.

The coverage generator 360 generates 310 buffers for the routable lane graph. For example, for each lane in the routable lane graph, the coverage generator 360 generates a buffer around the lane according to buffer settings. The buffer settings may indicate a particular distance from the lane to include in the buffer. As noted above, each lane in the map database 230 includes geometric information describing the lane. The coverage generator 360 extends the area of the lane to include all points that are within the particular distance indicated by the buffer settings from any point in the lane. As an example, if the lane is represented as a straight line from the start point to the end point, the coverage generator 360 generates a stadium-shaped buffer centered around the straight-line lane representation. If the lane has another shape, e.g., the lane is represented as a curved line, the coverage generator 360 generates a different buffer shape based on the shape of the lane. In some embodiments, a lane is represented as a two-dimensional shape (e.g., a rectangle), and the coverage generator 360 generates a buffer that extends outward from the boundaries of the lane. For a rectangular lane, the buffer is a rounded rectangle.

In some embodiments, the coverage generator 360 generates a shape for a buffer that accounts for real-world constraints on a user's movement outside the AV 110. For example, if a particular lane is along one side of a road having a median, and a pedestrian cannot cross from the lane to the side of the street opposite the median, the coverage generator 360 generates a buffer that does not include the side of the street opposite of the median and areas extending out from that side of the street. In some embodiments, the coverage generator 360 obtains crosswalk information and includes in the buffer areas that can be accessed by crosswalk, but does not include in the buffer areas that cannot be accessed by crosswalk.

Figure 4B:
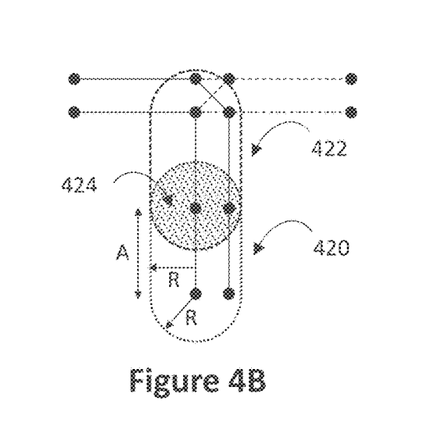

FIG. 4B illustrates two stadium-shaped buffers generated for two lanes in the routable lane graph shown in FIG. 4A. The coverage generator 360 receives the routable lane graph and generates buffers, e.g., the buffers 420 and 422, around the routable lanes (the lanes in FIG. 4A represented by solid lines). FIG. 4B illustrates outlines of the buffers 420 and 422 using two different styles of dashed lines to distinguish the two buffers 420 and 422. The buffers 420 and 422 have an overlapping portion 424, which is shaded in FIG. 4.

In this illustration, each of the lanes is represented as a straight line connecting a start point and an end point, represented as nodes. Each buffer has a stadium shape having a radius equal to the distance indicated in the buffer settings, e.g., a set walking distance from the lane. An example radius R for buffer 420 is shown in FIG. 4B. The stadium shape further has a straight side length that is equal to the distance between the start point and the end point. An example straight side length A for the buffer 420 is shown in FIG. 4B.

Figure 4C:
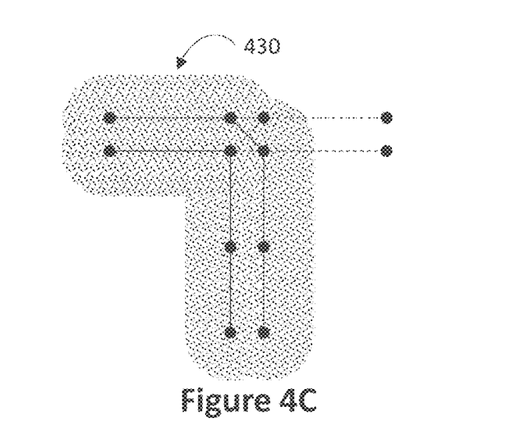

Having generated the buffers, the coverage generator 360 combines 315 the buffers to generate a coverage area. The coverage generator 360 combines multiple buffers into a single coverage area. Because the lanes are connected, and the areas of the buffers are larger than the areas of the lanes themselves, some buffers overlap. The coverage generator 360 de-duplicates the overlapping areas to generate the coverage area. FIG. 4C shows an example coverage area 430 for the routable lane graph shown in FIG. 4A. The coverage area 430 is represented as a shaded region overlaying the routable lane graph. The coverage area 430 may be referred to as a baseline coverage area, i.e., a coverage area based on the current map database 230, including all of the avoidance areas in the map database 230.

Having generated the baseline routable lane graph and the baseline coverage area, the routability system 250 generates routable lane graphs and coverage areas that remove avoidance areas from the map database 230. The routability system 250 selects 320 an avoidance area in the map database 230. The routability system 250 may iterate through each of the avoidance areas and, at step 320, select any previously unselected avoidance areas. In some embodiments, the routability system 250 iterates through a subset of the avoidance areas, e.g., based on the type of avoidance area (e.g., avoidance areas that can be removed through map updates), or based on a predicted difficulty or time for removing the avoidance area (e.g., a predicted difficulty for a software engineer to develop a fix to the AV software that removes an avoidance area).

The routable graph generator 260 then generates 325 a routable lane graph with the selected avoidance area restored, i.e., as through the avoidance area were removed from the map database 230, so that the AV 110 does not avoid traversing the selected avoidance area. For example, the routable graph generator 260 determines at least one additional lane that can be accessed if the AV 110 traverses the avoidance area, that the AV 110 could not access with the avoidance area (as reflected in the baseline routable lane graph). Generating this routable lane graph simulates the removal of the avoidance area, e.g., if a map manager updates the map database 230 so that the avoidance area can be removed, or a software engineer develops a software update so that the avoidance area can be removed. In some embodiments, rather than creating a routable lane graph anew from the map database 230, the routable graph generator 260 uses the baseline routable lane graph as a starting point, and adds in one or more lanes based on the removal of the avoidance area. In some embodiments, the routable graph generator 260 compares the baseline routable lane graph to the routable lane graph with the avoidance area removed to identify one or more lanes that are routable in the routable lane graph with the avoidance area removed, but were not routable in the baseline routable lane graph.

Figure 4D:
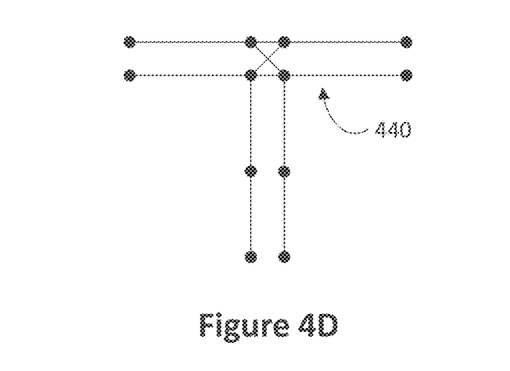
Figure 8:
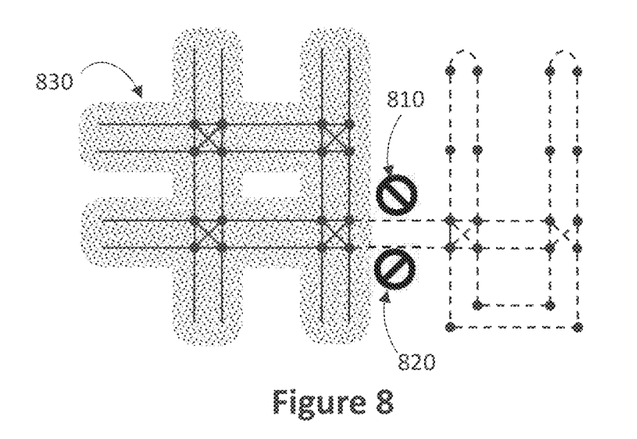
FIG. 8 illustrates an example coverage area showing AV fleet coverage based on map data with avoidance areas on two parallel lanes.
Figure 9:
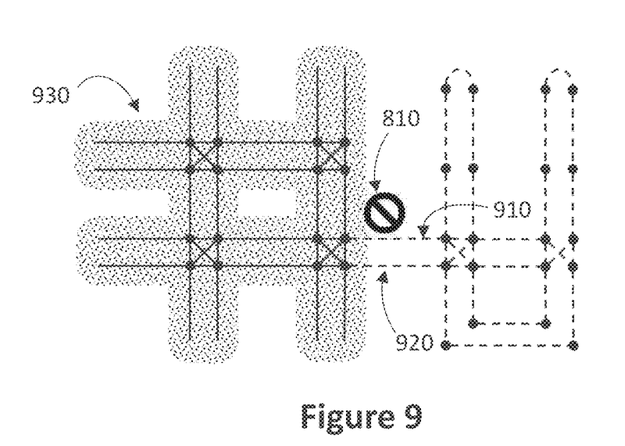
FIG. 9 illustrates an example coverage area showing AV fleet coverage for the map of FIG. 8 with one of the avoidance areas restored.

FIG. 4D illustrates an example portion of a routable lane graph with the avoidance area 414 removed. In this example, several lanes that were previously not routable are represented as solid lines, indicating that these lanes are now routable and an AV 110 could traverse them. For example, lane 416 in FIG. 4A was represented as a dashed line, and the corresponding lane 440 in FIG. 4D is represented as a solid line. In certain cases, removal of an avoidance area may not result in any additional lanes being added to the routable lane graph; an example is illustrated in FIGS. 8 and 9.

The coverage generator 270 generates 330 an updated coverage area based on the restored avoidance area. The coverage generator 270 may generate the updated coverage area by generating and combining buffers based on the routable lane graph, as described with respect to steps 315 and 320. In some embodiments, the coverage generator 270 may start from the baseline coverage area and add any additional buffers to the baseline coverage area based on any additional lanes in the routable lane graph with the avoidance area restored.

Figure 4E:
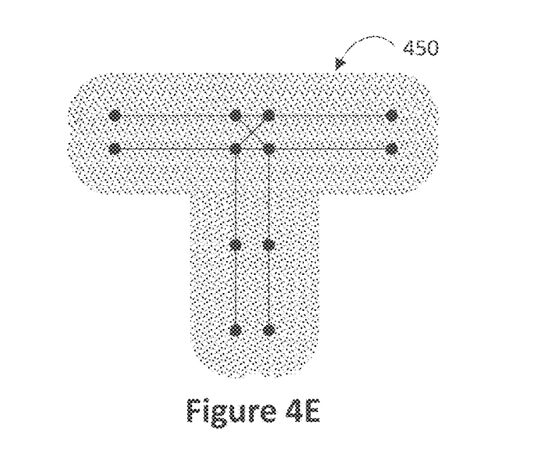

An example of an updated coverage area 450 is shown in FIG. 4E. The coverage area 450 includes buffers around the lanes that were not routable in the baseline routable lane graph shown in FIG. 4A, e.g., the coverage area 450 includes a buffer around the lane 440, which was changed from non-routable to routable in FIG. 4D.

Figure 4F:
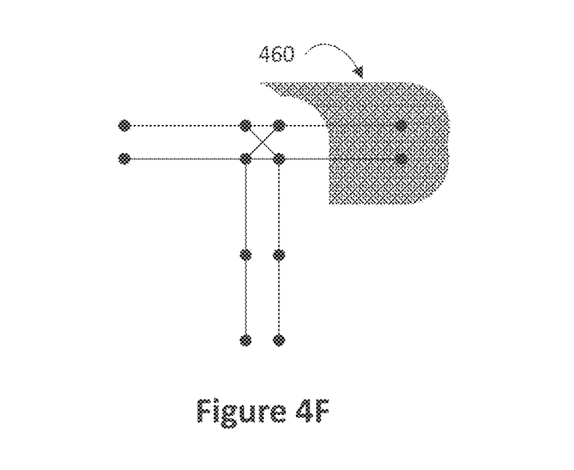

The coverage generator 270 determines 335 a restored coverage area that was created by restoring the avoidance area. For example, the coverage generator 270 compares the baseline coverage area to the updated coverage area and identifies a portion of the updated coverage area that was not in the baseline coverage area. The restored coverage area is a buffer region corresponding to the restored lane or lanes that excludes buffer regions in the baseline coverage area. As noted above, because buffers are larger than the lanes themselves, some buffers overlap; therefore, simply using the buffer of the restored lanes does not accurately describe the restored coverage. An example of a restored coverage area 460 is shown in FIG. 4F. The restored coverage area 460 is the portion of the coverage area 450 shown in FIG. 4E that was not included in the coverage area 430 shown in FIG. 4C.

The scoring system 280 calculates 340 a score for the restored coverage, e.g., based on the restored coverage area. The score indicates an impact of restoring access to the avoidance area. The score may be equal to a size of the restored coverage area, or based on the size of the restored coverage area. Alternatively, the score may be equal to a demand for AV service in the restored coverage area, based on the demand data 240. In some embodiments, the scoring system 280 computes the score based on the restored coverage area and one or more other factors, such as a market weighting base on the demand for service to the restored coverage area. In some embodiments, if the demand data 240 includes data relating to demand for different AV services (e.g., delivery service and ride service), the scoring system 280 may determine different scores for different services provided by the AV fleet, or the scoring system 280 may combine the demand data for different AV services and generate a single score. As another example, the avoidance areas in the map database 230 may be associated with an expected difficulty or length of time to remove the avoidance area, and the scoring system 280 incorporates the difficulty or length of time into the scores. As one example, the scoring system 280 multiplies the size of the restored coverage area by the demand in the restored coverage area, and divides the product by an expected amount of time to remove the avoidance area. In some embodiments, the scoring system 280 may apply weights to one or more factors, or perform other mathematical operations (e.g., squaring a factor, taking a square root of a factor, etc.) to balance or weight the various factors in the score.

The routability system 250 determines 345 whether there are more avoidance areas to score. If there are more avoidance areas to score, the routability system 250 returns to step 320 and selects another avoidance area. If the routability system 250 has scored all of the avoidance areas, or all of a particular set of avoidance areas, the routability system 250 may proceed to compare 350 the scores to identify one or more avoidance areas to restore. For example, the routability system 250 (e.g., the scoring system 280) may rank the avoidance areas by their scores, and select a certain number of the avoidance areas with the highest scores (e.g., the 10 or 50 highest), or select avoidance areas with scores above a certain threshold. In some embodiments, the routability system 250 reports the avoidance areas with their scores (ranked or unranked), and a person or group of people at the fleet management system use the report to identify one or more avoidance areas to remove.

A map manager updates 355 the map database 230 based on the identified avoidance areas to restore. For example, step 350 may identify ten high-priority avoidance areas with high scores, and the map manager updates the map database 230 to remove these avoidance areas. As noted above, in some embodiments, a map manager updates the map data to reflect real-world changes on a roadway. In some embodiments, an avoidance area may be removed by a software update, and the map manager, or a software engineer, removes the avoidance area after the software update is complete and deployed to the AV fleet 110.

Once an avoidance area has been removed, an AV 110 can traverse the avoidance area, or is more likely to traverse the avoidance area. For example, the vehicle manager 220 may instruct an AV 110 to travel a route that traverses the avoidance area.

Example Map with Two Avoidance Areas

Figure 5:
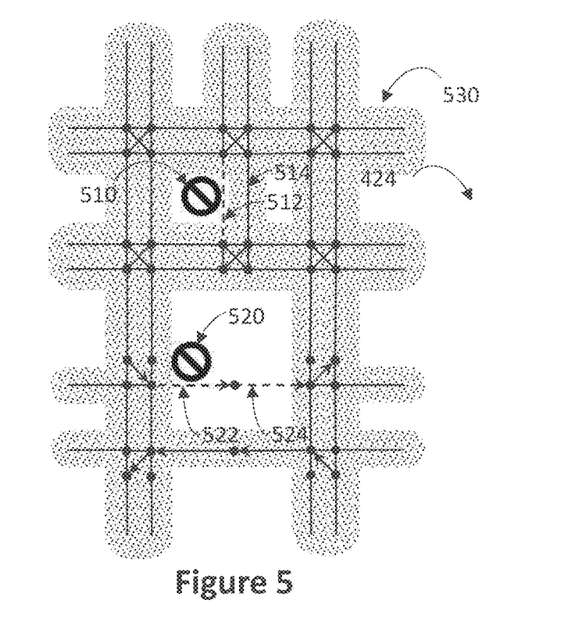
FIG. 5 illustrates an example coverage area showing AV fleet coverage based on map data with two avoidance areas.
Figure 6:
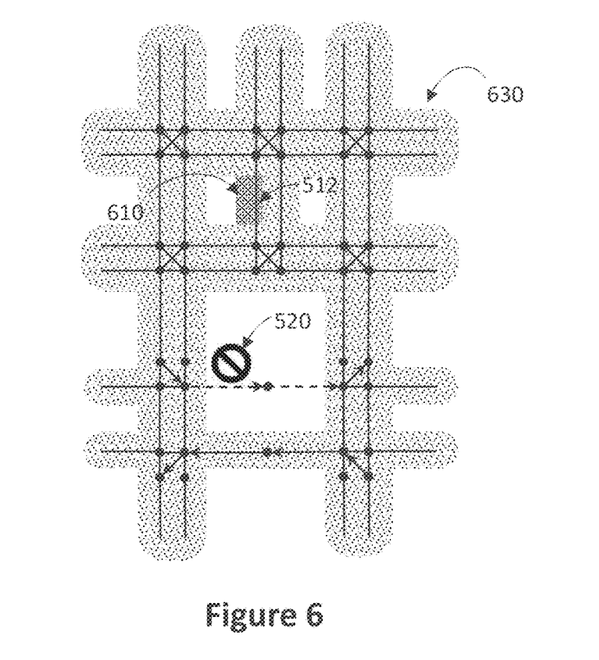
FIG. 6 illustrates an example coverage area showing AV fleet coverage for the map of FIG. 5 with one avoidance area restored.
Figure 7:
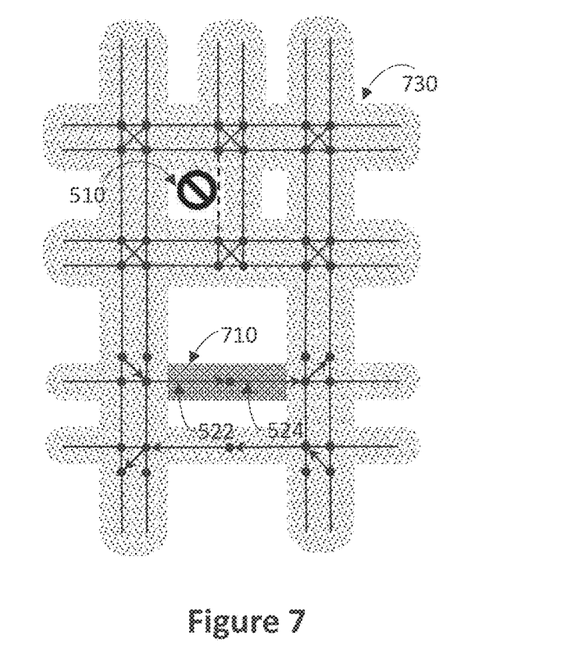
FIG. 7 illustrates an example coverage area showing AV fleet coverage for the map of FIG. 5 with the other avoidance area restored.

FIGS. 5-7 illustrate a comparison between restoring two avoidance areas in a map. FIG. 5 illustrates an example coverage area showing AV fleet coverage based on map data with two avoidance areas. FIG. 5 shows a routable lane map, with the routable lanes shown in solid lines, and non-routable lane shown in dashed lines. The map data includes two avoidance areas 510 and 520. Lane 512, which passes through the avoidance area 510, is not routable. However, lane 514, which is parallel to lane 512 and travels in the opposite direction of lane 512, is routable. Lane 522, which passes through avoidance area 520, is not routable. Lane 524, which travels in the same direction as lane 522 and can only be accessed after traversing lane 524, is also not routable. In this example, lanes 522 and 524 are lanes of a single-lane one-way street; the directionality of certain lanes is indicated by arrows (e.g., lanes 522 and 524 travel to the right in the orientation of FIG. 5). The coverage area 530 is generated based on the routable lanes, i.e., the lanes shown in FIG. 5, excluding the non-routable lanes 512, 522 and 524.

FIG. 6 illustrates an example coverage area 630 showing AV fleet coverage for the map of FIG. 5 with one avoidance area 510 restored. The coverage area 630 includes a restored coverage area 610, which is a coverage area provided by removing the avoidance area 510 and restoring the lane 512 to the map. FIG. 7 illustrates an example coverage area 730 showing AV fleet coverage for the map of FIG. 5 with the other avoidance area 520 restored. The coverage area 730 includes a restored coverage area 710, which is a coverage area provided by removing the avoidance area 520 and restoring the lanes 622 and 624 to the map. The restored coverage areas 610 and 710 are illustrated with darker shading than the rest of the coverage areas 630 and 730.

Visually comparing the restored coverage areas 610 and 710, the restored coverage area 710 in FIG. 7 has a larger area than the restored coverage area 610 in FIG. 6. If the scoring system 280 calculates scores based on the areas of the restored coverage areas 610 and 710, the score for removing the avoidance area 520 is larger than the score for removing the avoidance area 510. As described above, in some embodiments, the scoring system 280 may include other factors, such as AV demand within the restored coverage areas, or difficulty to remove the avoidance areas. If the avoidance area 520 takes more time to remove than the avoidance area 510, or if restored coverage area 710 has a lower demand than the restored coverage area 610, the score the avoidance area 520 may be smaller than the score for the avoidance area 510.

Assessing and Restoring Multiple Avoidance Areas

Figure 10:
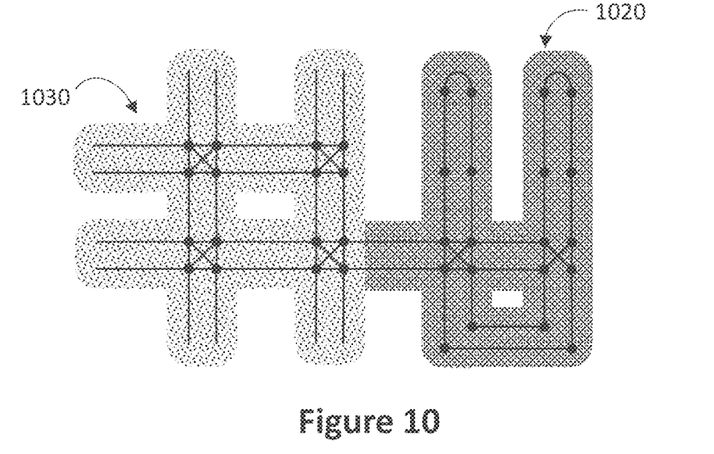
FIG. 10 illustrates an example coverage area showing AV fleet coverage for the map of FIG. 8 with both of the avoidance areas restored.

The process described with respect to FIGS. 3 and 4 considers individual avoidance areas, e.g., calculating a score for a given avoidance area independently of the other avoidance areas. In some cases, multiple avoidance areas may interact, such that the impact of removing multiple avoidance areas together is significantly greater than removing the avoidance areas alone. For example, the restored coverage area of two avoidance areas may be greater than the sum of the restored coverage area for a first avoidance area (without restoring a second avoidance area) plus the restored coverage area for the second avoidance area (without restoring the first avoidance area). An example of this is shown in FIGS. 8-10 and described below. As another example, a single software fix that affects multiple avoidance areas can simultaneously remove multiple avoidance areas from the map database 230.

Therefore, in addition to assessing individual avoidance areas alone, in some embodiments, the routability system 250 scores groups of avoidance areas together. First, the routability system 250 identifies one or more clusters of avoidance areas that may be related. For example, if the map database 230 indicates that multiple avoidance areas are related to a single software bug, the routability system 250 can identify all of the avoidance areas related to the software bug in the map database 230 and generate a cluster of these identified avoidance areas. As another example, the routability system 250 identifies two or more avoidance areas that are close to each other in the map data, e.g., in a distance sense (e.g., the physical distance between the avoidance areas, or distance between lanes that are not routable because of the avoidance areas), or in a network sense (e.g., the number of lanes and/or nodes traversed in a lane graph to reach one avoidance area from another avoidance area).

Having identified a cluster of nearby avoidance areas, the routability system 250 may then follow a similar process to the process shown in FIG. 3, but instead of selecting one avoidance area at step 320, and generating a routable lane graph with the single avoidance area restored at step 325, the routability system 250 (e.g., the routable graph generator 260) generates a routable lane graph with the cluster of avoidance areas restored. The coverage generator 270 then determines a restored coverage area or a set of restored coverage areas. The scoring system 280 calculates a score for the cluster of avoidance areas based on the restored coverage area. If the coverage generator 270 generates a set of geographically distinct coverage areas, the scoring system 280 calculates a score for the set of restored coverage areas, e.g., by summing the scores for each of the set of restored coverage areas.

Example Map with Interacting Avoidance Areas

FIG. 8 illustrates an example coverage area showing AV fleet coverage based on map data with avoidance areas on two parallel lanes. FIG. 8 shows a routable lane map, with the routable lanes shown in solid lines, and non-routable lane shown in dashed lines. The map data includes two avoidance areas 810 and 820. In this example, the avoidance areas 810 may represent lanes along a covered bridge, which the AV 110 is not able traverse. For example, the covered bridge may be new and not properly mapped in the map database 230. Alternatively, the AV software may not be adequately trained for the AVs 110 to traverse covered bridges, so these are avoided.

A baseline coverage area 830 is generated based on the routable lanes, i.e., the solid lanes shown in FIG. 8. In this example, the lanes along the avoidance areas 810 and 820, as well as the lanes to the right of the avoidance areas 810 and 820, are not routable. For example, the covered bridge may be the only way for a vehicle to enter or exit an island containing the roads on the right side of the map. Thus, the full right side of the map is not routable and is not included in the coverage area 830.

FIG. 9 illustrates an example coverage area showing AV fleet coverage for the map of FIG. 8 with one of the avoidance areas restored. In this example, the avoidance area 820 is restored, to allow AVs to travel through the avoidance area, i.e., along lane 920. In this case, restoring the avoidance area 820 does not change the routable lane graph, and the restored coverage area 930 is the same as the baseline coverage area 830 shown in FIG. 8. This is because the avoidance area 810 prevents an AV 110 from crossing back across the bridge along lane 910, so if an AV 110 were to cross the bridge along lane 920 (which travels from left to right), the AV 110 would not be able to cross the bridge in the opposite direction, along lane 910 (which travels from right to left), because of the avoidance area 810. In other words, if an AV 110 traversed lane 920, it would get stuck on the island, so the routable graph generator 260 does not add the lane 920 to the routable graph.

FIG. 10 illustrates an example coverage area showing AV fleet coverage for the map of FIG. 8 with both of the avoidance areas restored. In this example, the avoidance areas 810 and 820 are both restored, which enables AVs to travel through the avoidance areas 810 and 820, i.e., back and forth across the bridge. The routable graph generator 260 determines the lanes that can be accessed by restoring both of the avoidance areas 810 and 820, including the lanes 910 and 920.

In this case, restoring the avoidance areas 810 and 820 has a large effect on the routable lane graph, shown in the restored coverage area 1020. The restored coverage area 1020 is the portion of the coverage area 1030 illustrated with darker shading. If the avoidance areas 810 and 820 were only considered alone, the routability system 250 or a map manager may not recognize the impact of removing both of the avoidance areas 810 and 820. However, by simulating restoring both of the avoidance areas 810 and 820 together, the impact on the coverage area is clear. In particular, the scores for restoring either of the avoidance areas 810 and 820 alone is low (e.g., zero, because there is no restored coverage). The scoring system 280 computes a higher score for the restored coverage area 1020, indicating the impact of restoring the two avoidance areas 810 and 820 together.

SELECT EXAMPLES

Example 1 provides a method for identifying high-impact avoidance areas in a map, the method including identifying an avoidance area in a map database, the map database storing data describing a set of connected roads each having one or more lanes, and the avoidance area including an area in the map database that an AV avoids traversing; determining at least one lane that can be accessed by the AV if the AV traverses the avoidance area; generating a restored coverage area corresponding to the at least one lane, the restored coverage area corresponding to an area of restored coverage provided by the AV traversing the avoidance area; and computing a score based on the restored coverage area, the score indicating an impact of restoring access by the AV to the avoidance area.

Example 2 provides the method of claim 1, further including generating a first routable lane graph based on data in the map database, the first routable lane graph including a plurality of connected lanes along which an AV can be routed; and generating a second routable lane graph, the second routable lane graph including the plurality of connected lanes in the first routable lane graph and the at least one lane that can be accessed by the AV if the AV traverses the avoidance area.

Example 3 provides the method of claim 2, where determining the at least one lane that can be accessed by the AV if the AV traverses the avoidance area includes comparing the first routable lane graph to the second routable lane graph, where the at least one lane is routable in the second lane graph and not routable in the first lane graph.

Example 4 provides the method of claim 2, where generating the restored coverage area corresponding to the at least one lane includes generating a first coverage area corresponding to at least a portion of the lanes in the first routable lane graph; generating a second coverage area corresponding to at least a portion of the lanes in the second routable lane graph; and generating the restored coverage area by selecting one or more portions of the second coverage area that are not included in the first coverage area.

Example 5 provides the method of claim 1, where generating the restored coverage area includes generating at least one buffer corresponding to the at least one lane, and generating a buffer corresponding to a particular lane includes retrieving a start point and an end point for the lane; and generating a stadium-shaped region having a radius equal to a buffer distance and a straight side length equal to a distance between the start point and the end point.

Example 6 provides the method of claim 1, where the score based on the restored coverage area is a first score, the method further including identifying a second avoidance area in the map database, the second avoidance area including a second area in the map database that the AV avoids traversing; computing a second score based on a second restored coverage area for the second avoidance area; and comparing the first score to the second score to identify a higher-impact avoidance area.

Example 7 provides the method of claim 1, further including in response to determining that the computed score is above a threshold, updating the map database to remove the identified avoidance area; and instructing an AV to travel a route that traverses the avoidance area.

Example 8 provides the method of claim 1, further including retrieving demand data indicating demand for AV service to the restored coverage area; where the computed score is further based on the demand data.

Example 9 provides the method of claim 1, where the identified avoidance area is a first avoidance area, the method further including identifying a second avoidance area in the map database, the second avoidance area including a second area in the map database that the AV avoids traversing; determining at least one additional lane that can be accessed by the AV if the AV traverses the second avoidance area; generating a second restored coverage area corresponding to the at least one lane and the at least one additional lane, the second restored coverage area corresponding to an area of restored coverage provided by the AV traversing the first avoidance area and the second avoidance area; and computing a second score based on the second restored coverage area, the second score indicating an impact of restoring access by the AV to the first avoidance area and the second avoidance area.

Example 10 provides the method of claim 9, where an AV software update removes the first avoidance area and the second avoidance area from the map database.

Example 11 provides the method of claim 9, further including identifying the second avoidance area as an avoidance area within a specific geographic range of the first avoidance area.

Example 12 provides the method of claim 11, where the impact of restoring access by the AV to the first avoidance area and the second avoidance area together is greater than the impact of restoring access by the AV to the first avoidance area without restoring access to the second avoidance area plus the impact of restoring access to the second avoidance area without restoring access to the first avoidance area.

Example 13 provides system for identifying high-impact avoidance areas in a map, the system including a map database storing data describing a set of connected roads each having one or more lanes, and data describing at least one avoidance area including an area in the map database that an AV avoids traversing; and computer circuitry to identify an avoidance area in the map database; determine at least one lane that can be accessed by the AV if the AV traverses the avoidance area; generate a restored coverage area corresponding to the at least one lane, the restored coverage area corresponding to an area of restored coverage provided by the AV traversing the avoidance area; and compute a score based on the restored coverage area, the score indicating an impact of restoring access by the AV to the avoidance area.

Example 14 provides the system of claim 13, the computer circuitry further configured to generate a first routable lane graph based on data in the map database, the first routable lane graph including a plurality of connected lanes along which an AV can be routed; and generate a second routable lane graph, the second routable lane graph including the plurality of connected lanes in the first routable lane graph and the at least one lane that can be accessed by the AV if the AV traverses the avoidance area.

Example 15 provides the system of claim 14, where the computer circuitry, to generate the restored coverage area corresponding to the at least one lane, is configured to generate a first coverage area corresponding to at least a portion of the lanes in the first routable lane graph; generate a second coverage area corresponding to at least a portion of the lanes in the second routable lane graph; and generate the restored coverage area by selecting one or more portions of the second coverage area that are not included in the first coverage area.

Example 16 provides the system of claim 13, where the score based on the restored coverage area is a first score, the computer circuitry further configured to identify a second avoidance area in the map database, the second avoidance area including a second area in the map database that the AV avoids traversing; compute a second score based on a second restored coverage area for the second avoidance area; and compare the first score to the second score to identify a higher-impact avoidance area.

Example 17 provides the system of claim 13, further including a demand database storing demand data, the demand data indicating demand for AV service to geographic areas, where the computed score is further based on the demand data for the restored coverage area.

Example 18 provides a non-transitory computer-readable medium storing instructions for identifying high-impact avoidance areas in a map, the instructions, when executed by a processor, cause the processor to identify an avoidance area in a map database, the map database storing data describing a set of connected roads each having one or more lanes, and the avoidance area including an area in the map database that an AV avoids traversing; determine at least one lane that can be accessed by the AV if the AV traverses the avoidance area; generate a restored coverage area corresponding to the at least one lane, the restored coverage area corresponding to an area of restored coverage provided by the AV traversing the avoidance area; and compute a score based on the restored coverage area, the score indicating an impact of restoring access by the AV to the avoidance area.

Example 19 provides the non-transitory computer-readable medium of claim 18, where the instructions further cause the processor to generate a first routable lane graph based on data in the map database, the first routable lane graph including a plurality of connected lanes along which an AV can be routed; and generate a second routable lane graph, the second routable lane graph including the plurality of connected lanes in the first routable lane graph and the at least one lane that can be accessed by the AV if the AV traverses the avoidance area.

Example 20 provides the non-transitory computer-readable medium of claim 19, where the instructions further cause the processor to generate a first coverage area corresponding to at least a portion of the lanes in the first routable lane graph; generate a second coverage area corresponding to at least a portion of the lanes in the second routable lane graph; and generate the restored coverage area by selecting one or more portions of the second coverage area that are not included in the first coverage area.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method for identifying and restoring high-impact avoidance areas in a map, the method comprising:
    identifying a first avoidance area in a map database, the map database storing data describing a set of connected roads each having one or more lanes, and the first avoidance area comprising a first area in the map database that an autonomous vehicle (AV) avoids traversing;
    determining at least one lane that can be accessed by the AV if the AV traverses the first avoidance area;
    generating at least one buffer corresponding to the at least one lane, wherein generating a buffer corresponding to a particular lane comprises generating a stadium-shaped region based on a start point and an end point for the particular lane, the stadium-shaped region having a radius equal to a buffer distance and a straight side length equal to a distance between the start point and the end point;
    generating a first restored coverage area corresponding to the at least one lane based on the at least one buffer, the first restored coverage area corresponding to an area of restored coverage provided by the AV traversing the first avoidance area;
    computing a first score based on the first restored coverage area, the first score indicating an impact of restoring access by the AV to the first avoidance area;
    identifying a second avoidance area in the map database, the second avoidance area comprising a second area in the map database that the AV avoids traversing;
    computing a second score based on a second restored coverage area for the second avoidance area;
    comparing the first score to the second score to identify one of the first avoidance area and the second avoidance area as a higher-impact avoidance area;
    updating the map database to remove the higher-impact avoidance area; and
    instructing an AV to travel a route that traverses the higher-impact avoidance area.

2. The method of claim 1, further comprising:
    generating a first routable lane graph based on data in the map database, the first routable lane graph comprising a plurality of connected lanes along which an AV can be routed; and
    generating a second routable lane graph, the second routable lane graph including the plurality of connected lanes in the first routable lane graph and the at least one lane that can be accessed by the AV if the AV traverses the first avoidance area.

3. The method of claim 2, wherein determining the at least one lane that can be accessed by the AV if the AV traverses the first avoidance area comprises comparing the first routable lane graph to the second routable lane graph, wherein the at least one lane is routable in the second routable lane graph and not routable in the first routable lane graph.

4. The method of claim 2, wherein generating the first restored coverage area corresponding to the at least one lane comprises:
    generating a first coverage area corresponding to at least a portion of the lanes in the first routable lane graph;
    generating a second coverage area corresponding to at least a portion of the lanes in the second routable lane graph; and
    generating the first restored coverage area by selecting one or more portions of the second coverage area that are not included in the first coverage area.

5. The method of claim 1, further comprising:
    determining that the first score or second score of the higher-impact avoidance area is above a threshold, and in response, updating the map database to remove the identified higher-impact avoidance area.

6. The method of claim 1, further comprising:
    retrieving demand data indicating demand for AV service to the first restored coverage area;
    wherein the first score is further based on the demand data.

7. The method of claim 1, further comprising:
    identifying a third avoidance area in the map database, the third avoidance area comprising a third area in the map database that the AV avoids traversing;

determining at least one additional lane that can be accessed by the AV if the AV traverses the third avoidance area;

generating a third restored coverage area corresponding to the at least one lane and the at least one additional lane, the third restored coverage area corresponding to an area of restored coverage provided by the AV traversing the first avoidance area and the third avoidance area; and computing a third score based on the third restored coverage area, the third score indicating an impact of restoring access by the AV to the first avoidance area and the third avoidance area.

8. The method of claim 7, wherein an AV software update removes the first avoidance area and the third avoidance area from the map database.

9. The method of claim 7, further comprising identifying the third avoidance area as an avoidance area within a specific geographic range of the third avoidance area.

10. The method of claim 9, wherein the impact of restoring access by the AV to the first avoidance area and the third avoidance area together is greater than the impact of restoring access by the AV to the first avoidance area without restoring access to the third avoidance area plus the impact of restoring access to the third avoidance area without restoring access to the first avoidance area.

11. A system for identifying and restoring high-impact avoidance areas in a map, the system comprising:
a map database storing data describing a set of connected roads each having one or more lanes, and data describing at least one avoidance area comprising an area in the map database that an autonomous vehicle (AV) avoids traversing; and computer circuitry to:
identify a first avoidance area in the map database;
determine at least one lane that can be accessed by the AV if the AV traverses the first avoidance area;
generate at least one buffer corresponding to the at least one lane, wherein generating a buffer corresponding to a particular lane comprises generating a stadium-shaped region based on a start point and an end point for the particular lane, the stadium-shaped region having a radius equal to a buffer distance and a straight side length equal to a distance between the start point and the end point;
generate a first restored coverage area corresponding to the at least one lane based on the at least one buffer, the first restored coverage area corresponding to an area of restored coverage provided by the AV traversing the first avoidance area;
compute a first score based on the first restored coverage area, the first score indicating an impact of restoring access by the AV to the first avoidance area;
identify a second avoidance area in the map database;
compute a second score based on a second restored coverage area for the second avoidance area;
compare the first score to the second score to identify one of the first avoidance area and the second avoidance area as a higher-impact avoidance area;
update the map database to remove the higher-impact avoidance area; and
instruct an AV to travel a route that traverses the higher-impact avoidance area.

12. The system of claim 11, the computer circuitry further configured to:
generate a first routable lane graph based on data in the map database, the first routable lane graph comprising a plurality of connected lanes along which an AV can be routed; and
generate a second routable lane graph, the second routable lane graph including the plurality of connected lanes in the first routable lane graph and the at least one lane that can be accessed by the AV if the AV traverses the first avoidance area.

13. The system of claim 12, wherein the computer circuitry, to generate the first restored coverage area corresponding to the at least one lane, is configured to:
generate a first coverage area corresponding to at least a portion of the lanes in the first routable lane graph;
generate a second coverage area corresponding to at least a portion of the lanes in the second routable lane graph; and
generate the first restored coverage area by selecting one or more portions of the second coverage area that are not included in the first coverage area.

14. The system of claim 11, further comprising a demand database storing demand data, the demand data indicating demand for AV service to geographic areas, wherein the first score is further based on the demand data for the first restored coverage area.

15. A non-transitory computer-readable medium storing instructions for identifying and restoring high-impact avoidance areas in a map, the instructions, when executed by a processor, cause the processor to:
identify a first avoidance area in a map database, the map database storing data describing a set of connected roads each having one or more lanes, and the first avoidance area comprising a first area in the map database that an autonomous vehicle (AV) avoids traversing;
determine at least one lane that can be accessed by the AV if the AV traverses the first avoidance area;
generate at least one buffer corresponding to the at least one lane, wherein generating a buffer corresponding to a particular lane comprises generating a stadium-shaped region based on a start point and an end point for the particular lane, the stadium-shaped region having a radius equal to a buffer distance and a straight side length equal to a distance between the start point and the end point;
generate a first restored coverage area corresponding to the at least one lane based on the at least one buffer, the first restored coverage area corresponding to an area of restored coverage provided by the AV traversing the first avoidance area;
compute a first score based on the first restored coverage area, the first score indicating an impact of restoring access by the AV to the first avoidance area;
identify a second avoidance area in the map database, the second avoidance area comprising a second area in the map database that the AV avoids traversing;
compute a second score based on a second restored coverage area for the second avoidance area;
compare the first score to the second score to identify one of the first avoidance area and the second avoidance area as a higher-impact avoidance area;
update the map database to remove the higher-impact avoidance area; and
instruct an AV to travel a route that traverses the higher-impact avoidance area.

16. The non-transitory computer-readable medium of claim 15, wherein the instructions further cause the processor to:
- generate a first routable lane graph based on data in the map database, the first routable lane graph comprising a plurality of connected lanes along which an AV can be routed; and
- generate a second routable lane graph, the second routable lane graph including the plurality of connected lanes in the first routable lane graph and the at least one lane that can be accessed by the AV if the AV traverses the first avoidance area.

17. The non-transitory computer-readable medium of claim 16, wherein the instructions further cause the processor to:
- generate a first coverage area corresponding to at least a portion of the lanes in the first routable lane graph;
- generate a second coverage area corresponding to at least a portion of the lanes in the second routable lane graph; and
- generate the first restored coverage area by selecting one or more portions of the second coverage area that are not included in the first coverage area.

\* \* \* \* \*